Feb. 23, 1926.

S. D. NESMITH

ELECTRIC WATER HEATER

Filed Oct. 8, 1923

1,574,053

Inventor
SAMUEL D. NESMITH.

By A. B. Bowman
Attorney

Patented Feb. 23, 1926.

1,574,053

UNITED STATES PATENT OFFICE.

SAMUEL D. NESMITH, OF SAN DIEGO, CALIFORNIA, ASSIGNOR, BY DIRECT AND MESNE ASSIGNMENTS, OF THIRTY PER CENT TO A. S. BRIDGES, OF SAN DIEGO, CALIFORNIA; TEN PER CENT TO ROGER WELLES, TEN PER CENT TO R. R. RICHARDSON, TWO PER CENT TO E. J. CALLAHAN, OF GUADALAJARA, MEXICO; FIVE PER CENT TO J. B. OSBORN, OF SAN DIEGO, CALIFORNIA; FIVE PER CENT TO (MRS.) KATHRYN OSBORN, FIVE PER CENT TO J. H. BULMER, OF SAN DIEGO, CALIFORNIA; AND THIRTY-THREE PER CENT TO (MRS.) MARY E. NESMITH (WIFE), OF SAN DIEGO, CALIFORNIA.

ELECTRIC WATER HEATER.

Application filed October 8, 1923. Serial No. 667,221.

*To all whom it may concern:*

Be it known that I, SAMUEL D. NESMITH, a citizen of the United States, residing at San Diego, in the county of San Diego and State of California, have invented a certain new and useful Electric Water Heater, of which the following is a specification.

My invention relates to electric water heaters, and the objects of my invention are: first, to provide a heater of this class which is provided with a plurality of flat water conducting channels connected in series and which are heated by means of electric heating elements positioned contiguous to and between adjacent water channels, forming a long, continuous, thin film of water with heating elements on both sides, the same being insulated therefrom; second, to provide tubes for a heater of this class, the combined thickness of the opposite walls of which is approximately double that of the film of water passing therethrough; third, to provide a substantially instantaneous electric water heater and a water heater in which the electric current for heating the water in the same is automatically controlled when the water is turned on or off; fourth, to provide an electric water heater in which the electric heating units positioned between the water conducting channels may be readily removed for replacing or repairing the same; fifth, to provide a water heater of this class in which the water conducting channels are thoroughly insulated from the electric heating elements, thus insuring against the electric current coming in contact with the water; sixth, to provide a novelly constructed water heater of this class, and seventh, to provide an electric water heater which is very simple and economical of construction, durable, efficient, and which will not readily deteriorate or get out of order.

Figure 1:
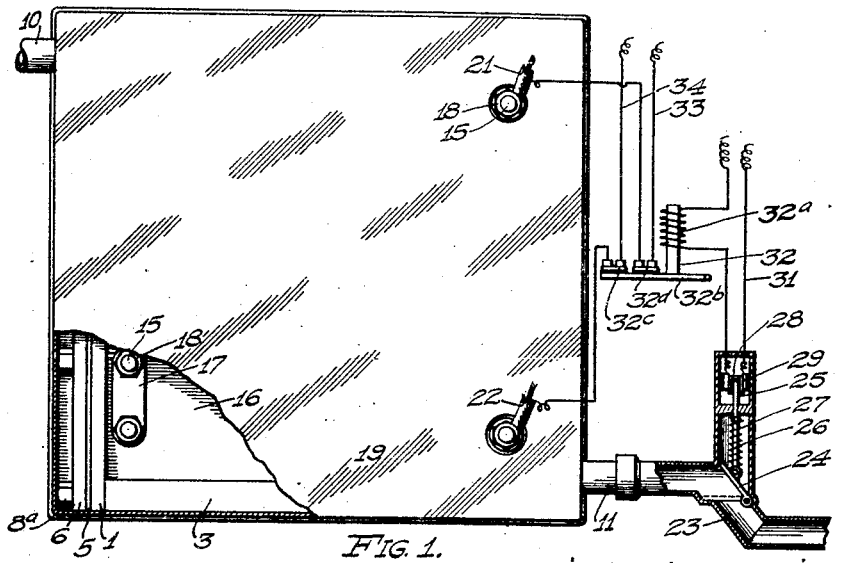
Figures 2, 3:
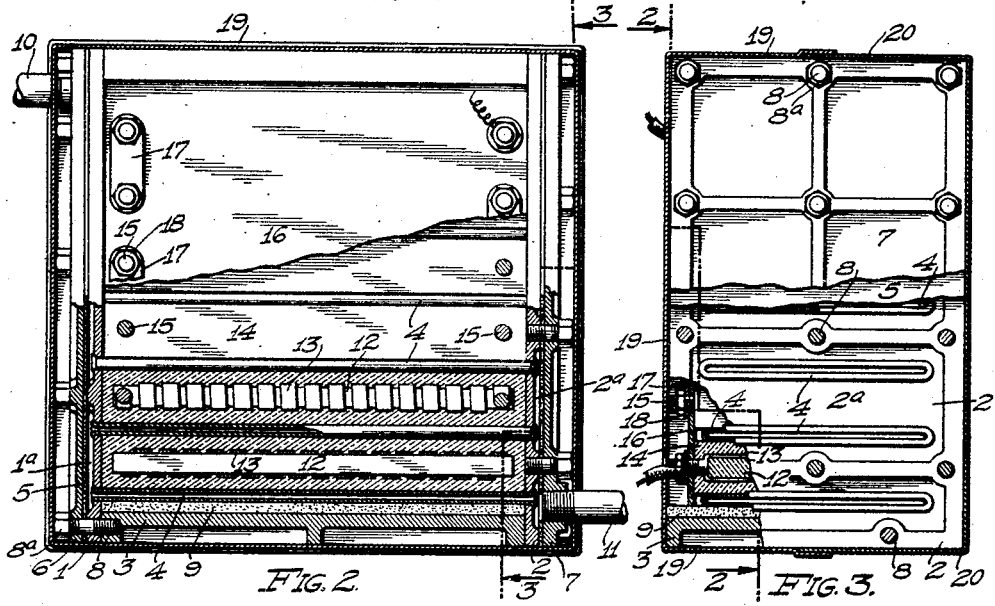

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a front elevational view of my electric water heater with certain parts and portions thereof broken away and in section to facilitate the illustration and showing the same dagrammatically connected with an electric switch and control mechanism; Fig. 2 is a similar view thereof in section, with the section taken through 2—2 of Fig. 3, and Fig. 3 is a sectional elevational view thereof, taken at right angles to that of Fig. 2 and through 3—3 thereof.

Like characters of reference refer to similar parts and portions throughout the several views of the drawings.

The water tube supporting members 1 and 2, tie members 3, water tubes 4, heat insulating plates 5, end plates 6 and 7, studs 8, heat insulating material 9, water conductors 10 and 11, core 12, electric heating elements 13, insulating material 14, terminal posts 15, insulating plates 16, terminal connecting members 17, nuts 18, casing members 19 and 20, electric conductors 21 and 22, valve casing 23, valve 24, plunger 25, connecting member 26, spring 27, contact members 28 and 29, conductors 30 and 31, relay 32, and the conductors 33 and 34, constitute the principal parts and portions of my water heater structure and control mechanism.

The water tube supporting members 1 and 2 of my heater are identical in construction but positioned in reverse order and are supported in spaced relation with each other at their ends by means of the tie members 3. Extending between the members 1 and 2 are the water tubes 4 extending through said members and welded or riveted over at their projecting ends. The water tubes 4 are preferably made of flattened copper tubing of large diameter, or other material of high heat conductivity, so that a very thin channel for the water is formed. There are preferably provided an odd number of water tubes to minimize the cost of construction, and the opposite ends of each alternate pair of tubes are connected by means of recess portions 1ª and 2ª in the outside faces of the members 1 and 2, substantially as shown in Fig. 2 of the drawings. Positioned against the members 1 and 2 and enclosing the recess portions 1ª and 2ª are the heat insulating plates 5, against the outer faces of which are positioned the end plates 6 and 7, which end plates are also identical in construction and positioned in reverse order relatively to each other. The end plates 6 and 7, the insulating plates 5, and the members 1 and 2, as well as the members 3, are secured relatively to each other by means of the studs 8 and the nuts 8ª. Between the end water tubes 4 and the tie members 3 is provided insulating material 9. Secured in the one end of the end plate 6 is the water outlet conductor 10, communicating with one of the end conductors 4, and positioned and secured in the corresponding end of the end plate 7 is the water inlet conductor 11, communicating with the water tube at the opposite end of the heater, substantially as shown in Fig. 2 of the drawings.

The electric heating units of my water heater consist of electric heating elements 13 wound around a core 12 of insulating material, and moulded in a casing 14 of heat conducting and electric insulating material, preferably alundum. At the ends of the heating elements 13 are provided the outwardly extending terminal posts 15, which extend through the moulded casings 14 and an insulating plate 16, one of which is positioned at the front and another at the back sides of the heater. The terminal posts 15 of each unit are connected with the corresponding posts of the adjacent and oppositely positioned heating elements by means of the connecting members 17 and the nuts 18, as illustrated in the drawings. The water heater is preferably enclosed by means of a sectional casing consisting of the members 19 and 20. Through the front side of the casing member 19 extend the conductors 21 and 22, which conductors are preferably connected with the heating unit positioned at the opposite ends of the heater.

The heater is automatically controlled by means of a valve and switch mechanism, which consists of a valve casing 23 secured to the water inlet conductor 11 in which casing is pivotally mounted a valve 24, which is automatically opened when the water is drawn through the heater. The valve member 24 is pivotally connected by means of the connecting rod 26 with the plunger 25 reciprocally mounted in an extended portion of the valve casing 23. A compression spring 27 is positioned around the connecting rod 26 between the valve 24 and the portion serving as a guide for the plunger 25. At the upper end of the plunger 25 is provided a contact member 28, secured thereto and insulated therefrom, which is adapted to engage with and connect the contact members 29 when the valve 24 is opened by reason of the water passing through the heater. The contact members 29 are supported inside of the extended portion of the valve casing 23 and insulated therefrom, and are connected by means of the conductors 30 and 31 with a source of electrical energy. Positioned in the conductor 30 is the solenoid 32ª of the relay 32, which, when the valve 24 is opened, is energized, attracting its relay bar 32ᵇ, which controls the switch of the conductors connected with the heating units. I have shown, diagrammatically, a pair of switch members 32ᶜ and 32ᵈ secured to and insulated from the bar 32ᵇ and adapted to connect the contact portion at the ends of the conductors 21 and 22 and the conductors 33 and 34 connected with a source of electrical energy It will be noted, therefore, that when the valve 24 is opened the conductors 21 and 22, connected with the heating elements of the electric water heater, are connected respectively with the conductors 33 and 34.

It is obvious from this construction as illustrated in the drawings and disclosed in the foregoing specification that there is provided an electric water heater as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. An electric water heater, including separate spaced apart vertical supporting members, a plurality of water tubes extending between and through said supporting members, and end members positioned on the outer sides of said supporting members, and extending across the end of all of said tubes, there being provided hollow portions between said supporting and said end members for connecting the ends of certain of said water tubes with each other.

2. An electric water heater, including separate spaced apart vertical supporting members, a plurality of horizontal water tubes extending between and through said supporting members, end members positioned on the outer sides of said supporting members and extending across the ends of all of said tubes, there being provided hollow portions between said supporting and said end members for connecting the ends of certain of said water tubes with each other, and inlet and outlet water conductors secured to said end members and communicating with oppositely disposed hollow portions between said end members and said supporting members.

3. An electric water heater, including separate spaced apart vertical supporting members, a plurality of water tubes extending between and through said supporting members, end members positioned on the outer sides of said supporting members and extending across the ends of all of said tubes, there being provided hollow portions between said supporting and said end members for connecting the ends of certain of said water tubes with each other, and electric heating units positioned adjacent and between adjacent water tubes, and spaced therefrom.

4. An electric water heater, including separate spaced apart supporting members, a plurality of water tubes extending between and through said supporting members, end members positioned on the outer sides of said supporting members and extending across the ends of all of said tubes, there being provided hollow portions between said supporting and said end members for connecting the ends of certain of said water tubes with each other, and electric heating units positioned adjacent and between adjacent water tubes and spaced therefrom, said heating units being removably positioned between and adjacent said water tubes and electrically connected in series with each other.

5. An electric water heater, including a frame, and a plurality of flattened water tubes of a material of high heat conductivity, positioned between and secured to opposite portions of said frame, there being provided pockets at the outer portions of said frame supporting said tubes for connecting adjacent ends of said water tubes, whereby said water tubes are connected in series with each other.

6. An electric water heater, including a frame, a plurality of flattened water tubes of a material of high heat conductivity, positioned between and secured through opposite portions of said frame, there being provided pockets at the outer portion of said frame supporting said tubes for connecting adjacent ends of said water tubes, whereby said water tubes are connected in series with each other, end plates positioned on the outer sides of the tube supporting portions of said frame, forming enclosed channels for connecting said water tubes, and insulating plates positioned between said tube supporting portions and said end plates, and between the outer water tubes and the other side portions of said frame.

7. An electric water heater, including a frame provided with water tube supporting members and spacing members, a plurality of flattened water tubes of a material of high heat conductivity, positioned between and secured through said supporting members, there being provided pockets at the outer portions of said supporting members for connecting adjacent ends of said water tubes, whereby said water tubes are connected in series with each other, and a plurality of removable heating units positioned adjacent each and between each pair of water tubes, and spaced therefrom.

8. An electric water heater, including a frame provided with water tube supporting members and spacing members, a plurality of flattened water tubes positioned between and secured to said supporting members, there being provided pockets at the outer portions of said supporting members for connecting adjacent ends of said water tubes, whereby said water tubes are connected in series with each other, end plates positioned on the outer sides of the supporting members of said frame forming enclosed channels for connecting said water tubes, insulating plates positioned between said supporting members and said end plates, and between the outer water tubes and said spacing members, and an inlet and an outlet conductor communicating with said water tubes and secured to said end plates.

9. An electric water heater, including a casing with an inlet and outlet, a plurality of bodies of heat conducting and electric insulating material mounted therein, a thin, metallic, continuous, zigzag, water channel means in which the material of said means on its opposite sides throughout its length is double the thickness of the film of water passing therethrough, mounted in said heat conducting and electric insulating material, and electric heating elements mounted in said material on opposite sides of said water channel means.

In testimony whereof, I have hereunto set my hand at San Diego, California, this 27th day of September, 1923.

SAMUEL D. NESMITH.